(12) United States Patent
Quevedo et al.

(10) Patent No.: US 12,363,561 B2
(45) Date of Patent: Jul. 15, 2025

(54) AUTONOMOUS PROVISIONING OF A DECENTRALIZED NETWORK

(71) Applicant: JDRF ELECTROMAG ENGINEERING INC., Mississauga (CA)

(72) Inventors: Paul T. Quevedo, Scarborough (CA); Elias Boukhers, Hamilton (CA); Roumanos Dableh, Oakville (CA)

(73) Assignee: JDRF ELECTROMAG ENGINEERING INC., Mississauga (CA)

( * ) Notice: Subject to any disclaimer, the term of this patent is extended or adjusted under 35 U.S.C. 154(b) by 390 days.

(21) Appl. No.: 18/245,689

(22) PCT Filed: Sep. 15, 2021

(86) PCT No.: PCT/IB2021/058418
§ 371 (c)(1),
(2) Date: Mar. 16, 2023

(87) PCT Pub. No.: WO2022/058911
PCT Pub. Date: Mar. 24, 2022

(65) Prior Publication Data
US 2023/0354062 A1 Nov. 2, 2023

Related U.S. Application Data

(60) Provisional application No. 63/079,718, filed on Sep. 17, 2020.

(51) Int. Cl.
*H04W 4/50* (2018.01)
*H04W 12/64* (2021.01)
*H04W 24/02* (2009.01)

(52) U.S. Cl.
CPC ........... *H04W 24/02* (2013.01); *H04W 12/64* (2021.01)

(58) Field of Classification Search
CPC ....... H04W 48/16; H04W 84/20; H04W 4/50; H04W 4/80; H04W 84/18; H04W 12/71;
(Continued)

(56) References Cited

U.S. PATENT DOCUMENTS 10,779,196 B2  9/2020  Roy
10,932,107 B2  3/2021  Bae
(Continued)

OTHER PUBLICATIONS

International Search Report issued in PCT/IB2021/058418 mailed Dec. 29, 2021 (2 pages).

*Primary Examiner* — Quan M Hua
(74) *Attorney, Agent, or Firm* — DLA PIPER LLP (US)

(57) ABSTRACT

An example of an apparatus to provision a decentralized network is provided. The apparatus includes a memory storage unit to store a status identifier to indicating whether the apparatus is in a non-provisioned state or a provisioned state. The apparatus further includes a beacon transmitter to transmit an outgoing beacon signal and a beacon receiver to receive an incoming beacon signal from an external device. The apparatus includes an infrared communicator to send and receive signals with the external. In addition, the apparatus in the non-provisioned state includes an election engine to determine a priority relative to the external device upon receiving the incoming beacon signal. The apparatus also includes a provisioning engine to change the status identifier from the non-provisioned state to the provisioned state and to send a provisioning key to the external device to join a network upon confirmation the external device is within the secure space.

20 Claims, 6 Drawing Sheets

(58) Field of Classification Search
CPC ......... H04W 36/0007; H04W 36/0009; H04W 36/0016; H04W 36/142; H04W 84/045; H04W 8/005; H04W 84/10; H04W 88/04; H04L 41/0806; H04L 2101/622; H04L 41/0895; H04L 63/0876
See application file for complete search history.

(56) References Cited

U.S. PATENT DOCUMENTS

| | | |
|---|---|---|
| 10,951,470 B2 | 3/2021 | Hu |
| 2015/0081837 A1* | 3/2015 | Bernier .................. H04W 4/80 |
| | | 709/217 |
| 2017/0064583 A1 | 3/2017 | Roy |
| 2019/0090162 A1 | 3/2019 | Roy |
| 2019/0200193 A1* | 6/2019 | Bae ...................... H04W 8/005 |
| 2019/0349252 A1* | 11/2019 | Hu ...................... H04L 41/0895 |
| 2021/0160133 A1 | 5/2021 | Hu |

* cited by examiner

AUTONOMOUS PROVISIONING OF A DECENTRALIZED NETWORK

CROSS-REFERENCE TO RELATED APPLICATIONS

This application is a National Stage Application of International Application No. PCT/IB2021/058418 filed Sep. 15, 2021, which claim priority to U.S. Provisional Application No. 63/079,718 filed Sep. 17, 2020. All of the foregoing are incorporated by reference in their entireties.

BACKGROUND

Modern residential and commercial building automation systems employ wireless mesh networks to provide secure digital connectivity to system devices. In a large commercial building, a wireless mesh network may contain several thousand devices. In operation, these devices communicate securely to protect against various threats, such as replay attacks, man-in-the-middle attacks and trash-can attacks, among others. Some examples such as wireless mesh communication protocols, such as Bluetooth Mesh, are capable of meeting both the scale and security challenges faced by the building automation system industry for small and large networks.

The deployment of a secure wireless mesh network is arduous and presents numerous challenges to a variety of stakeholders. In particular, the deployment process may involve three phases: network design, network setup and network maintenance. These phases are often performed by different companies, may involve several iterations and may take months to complete.

The network design phase generates the specification of the building automation system network architecture. The architecture contains of a set of distributed wireless controllers and a variety of devices including, but not limited to, sensors and wall switches. The design involves the selection of the quantity, location and type of distributed wireless controller and the mapping a set of devices to a given distributed wireless controller. A primary objective of the design phase is to ensure that key constraints, such as the distance between a distributed wireless controller and a device, are not exceeded.

The network setup phase involves manually adding un-provisioned devices to the secure wireless mesh network through a process known as provisioning. Provisioning is generally performed onsite by trained technical personnel with a provisioner apparatus, such as a smartphone. Upon initial installation, a device is an un-provisioned state and is provisioned to join the network. The objectives of the provisioning process are the authentication of the un-provisioned device and the formation of a secure link to the un-provisioned device. The provisioning process involves exchanges of data between the provisioner apparatus and the un-provisioned device that allows the un-provisioned device to become an authorized mesh network device, which may often be referred to as a "node". The provisioning phase follows a prescriptive process that complies with the security policies and procedures of a given wireless mesh communication protocol.

For example, the provisioning phase for the Bluetooth Mesh protocol consists of a five-step process: Beaconing, Invitation, Public Key Exchange, Authentication and Distribution of Provisioning Data. The provisioning of a Bluetooth Mesh network is defined and described by the Bluetooth SIG.

The network maintenance phase involves the change management of the network as devices are added, removed, relocated or replaced. This is a manual process carried out periodically by a building manager of other person responsible for network maintenance. In addition to updating the mesh network, the network maintenance phase also involves verifying that the changes do not adversely affect the performance, such as latency and reliability, of the network significantly. The successful implementation of even a small change to the number of devices involves an in-depth understanding of the network topology and constraints. For example, depending on the available bandwidth and desired location, the addition of a new device may involve adding an additional wireless distributed controller.

BRIEF DESCRIPTION OF THE DRAWINGS

Reference will now be made, by way of example only, to the accompanying drawings in which.

DETAILED DESCRIPTION

Figure 1:
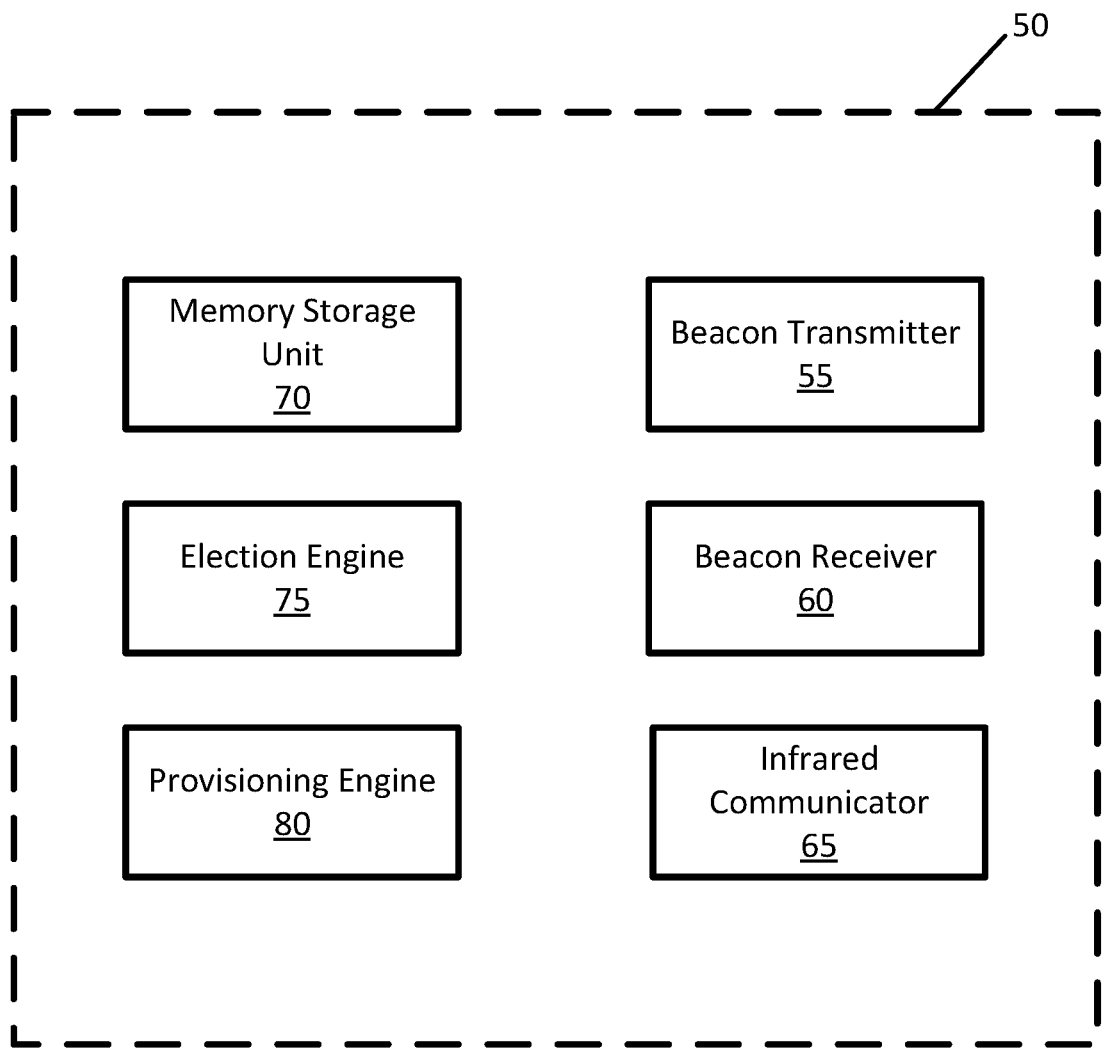
FIG. 1 is a schematic representation of the components of an apparatus to provision a decentralized network.

An autonomous provisioning of devices onto a secure wireless mesh network is provided. The devices self-organize, mutually authenticate and build a secure communication link without human involvement or a provisioner device, such as a smartphone. The resulting mesh network is decentralized, consisting exclusively of provisioned devices, and operates without an external supervisory hardware or software-based agent. Accordingly, the decentralized network may replace a conventional network design phase without the use of a distributed wireless controllers. In addition, the network setup phase may be automated through the application of an autonomous provisioning process. Furthermore, the devices may include a monitoring option to carry out the network maintenance phase on an ongoing basis. A distributed network refers to a system architecture where one or more distributed wireless controllers run a control logic application that governs the operating behavior of devices across the network. For example, the control logic application processes event messages that are generated by system input devices, such as a motion sensor, applies operating rules, which may embody an event priority management scheme, and responds by dispatching commands to a system output device, such as a light source which may be a LED Driver in a light fixture.

A decentralized network does not contain any distributed wireless controllers. Instead, each device in a decentralized network includes a local control logic application and operates as an independent device that is responsible for interacting directly with other devices connected to the decentralized network. In this example, a device connected to the decentralized network may include a motion sensor and an output device, such as a light source, and be capable to issue a control command directly to a group of other devices connected to the decentralized network. Each device that received the control command may process the command according a local control logic application, which may result in the adjustment of the light source associated with the device. Accordingly, it is to be appreciated by a person of skill in the art with the benefit of this description that a decentralized network does not have a single point of control which provides for a system that is more reliable than a distributed network.

An apparatus to operate as part of a system to provision a decentralized network is provided. In particular, the apparatus provides a provisioning process that does not involve involvement from a human operator or a provisioner apparatus to start, monitor or end the provisioning process. The apparatus is compatible with a decentralized network without the use of a distributed wireless controller, a host controller, an external software agent or other device. In addition, the apparatus may also be compatible with the industry standard mesh communication protocols, such as Bluetooth Mesh. In some examples, the apparatus may be configured to continuously to respond to changes in the network. For example, the apparatus may automatically detect and apply configuration changes to allow for the addition, removal, relocation or replacement of un-provisioned or provisioned devices to the decentralized network. It is to be appreciated that the apparatus may provision new devices on the decentralized network and monitor for changes and updates in a parallel procedure. In the present example, the apparatus may confirm that devices are within the same secure space prior to provisioning on the same network and allow for multiple decentralized networks to be merged. Given the decentralized network architecture formed by a plurality of the apparatuses and the characteristics of the autonomous process, network maintenance may be significantly reduced. Persons with little training may also add, remove, relocate or replace provisioned devices in the decentralized network or add more non-provisioned devices to a space to be connected to the decentralized network.

Referring to FIG. 1, a schematic representation of an apparatus to provision a decentralized network is generally shown at 50. The apparatus 50 may include additional components, such as various additional interfaces and/or input/output devices such as indicators to interact with a user or installer of the apparatus 50. The interactions may include viewing the operational status, updating parameters, or resetting the apparatus 50. In the present example, the apparatus 50 is provision a new network from a non-provisioned state. It is to be appreciated by a person of skill in the art with the benefit of this description that the apparatus 50 may join a decentralized network from a non-provisioned state when a decentralized network has already be established by other devices. In the present example, the apparatus 50 includes a beacon transmitter 55, a beacon receiver 60, an infrared communicator 65, a memory storage unit 70, an election engine 75, and a provisioning engine 80.

The beacon transmitter 55 is to transmit an outgoing beacon signal from the apparatus 50. In the present example, the beacon signal is broadcasted includes a status identifier of the apparatus 50 to indicate whether the apparatus 50 is in a non-provisioned state or a provisioned state. In other examples, the beacon signal may also include metadata about a decentralized network when the apparatus 50 is in the provisioned state. The manner by which the beacon signal is transmitted is not particularly limited. In the present example, the beacon signal is a radio frequency signal. In other examples, the beacon signal may be a higher or lower frequency electromagnetic signal, such as an infrared signal. Further examples may also use other types of signals such as an acoustic signal.

When the apparatus 50 is in the non-provisioned state, the beacon transmitter 55 transmits the beacon signal upon power-up to provide information potentially nearby devices within the range of the beacon signal. The beacon signal may be transmitted periodically and may include additional data to identify the device, such as a device specific identifier. In the present example, the beacon transmitter 55 is not directed in a specific direction and broadcasts in all directions. In other examples, the beacon transmitter 55 may be directional to direct a beacon signal in a direct, such as if the apparatus 50 were to be placed near a wall.

The beacon receiver 60 is to receive an incoming beacon signal from an external device. In the present example, the beacon signal received may be broadcasted from a nearby device and include information such as a status identifier of the external device to indicate whether it is in a non-provisioned state of a provisioned state. The manner by which the beacon signal is received is not particularly limited. In the present example, the beacon signal received may be similar to the beacon signal transmitted by the beacon transmitter 55, except that it is generated by an external device instead of the apparatus 50.

The infrared communicator 65 is to send and receive signals with an external device using a different type of signal than the beacon signal. In the present example, the infrared communicator 65 uses electromagnetic waves in a range of about 850 nm to about 940 nm. The use of another signal to communicate with the external device may be used to confirm that the external device is within a predetermined proximity of the apparatus. In particular, the infrared communicator 65 may be used to confirm the external device is within the same secure space. It is to be appreciated by a person of skill in the art with the benefit of this description that by communicating with infrared signals, the signals will not be able to penetrate generally opaque walls. Therefore, beacon signals received by the beacon receiver 60 may be radio frequency signals originating through a building wall, ceiling, or floor from room that is controlled by another tenant of the building. Accordingly, by establishing communications via an infrared signal, it is to be understood that the apparatus 50 and the external device are within the same physical space.

In the present example, the physical proximity may be determined with a reciprocal process whereby the apparatus 50 and the external device successively emit an infrared signal and receive the infrared signal emission in response. For example, the apparatus 50 may emit an infrared signal via the infrared communicator 65 and matches a known device in a non-provisioned state, such as a device from which the beacon receiver 60 received a beacon signal. The apparatus 50 may then request that each external device in a non-provisioned state that received the infrared signal emitted by the infrared communicator 65 in turn response with their own infrared signal, which may be verified by the apparatus 50 through a validation process.

The receipt of an infrared signal response may be used to confirm that both the apparatus 50 and the external device from where the response originated are located in same secure space. In the present example, the infrared verification process may be carried out within seconds and used to automatically detect and adapt to changes environment, such as the position of a movable wall, devices being added, removed or relocated, and reconfiguration of room boundaries, all of which infrared signals may travel around. However, if there is a solid wall without a hole or window, typical of walls separating tenants and floors in a building, it can be assumed that the apparatus 50 and the external device are not in the same secure space.

The manner by which the infrared communicator 65 transmits an infrared signal is not limited. In some examples, the infrared communicator 65 may illuminate a field of view using an infrared light emitting diode to project a known pattern. The pattern is not limited and may be simple, such as a circle, or complex, such as a grid. In other examples, the apparatus 50 may capture an image of scene located within a field of view and may do so in a repetitive manner with a variety of infrared illumination levels. The images may be captured by the infrared communicator 65 using an image sensor that has the ability to capture the pattern projected.

The image sensor used to capture a projected pattern is not particularly limited. For example, the image sensor may be a low-resolution image sensor. It is to be appreciated that a low-resolution sensor not physically able to capture images with any identifiable information, such as faces, is preferable to a high-resolution image sensor in a commercial building application due to privacy concerns that may arise from collecting images.

In further examples, the apparatus 50 may consider additional sensor data to determine a time to communicate with an external device with infrared signals. For example, the apparatus 50 may analyze the motion pattern detected and/or daylight levels to determine when the process is to continue to reduce the demand on computational resources. In other examples, the apparatus 50 may optionally receive data from nearby external devices on the same distributed network to determine pattern across a larger area.

The memory storage unit 70 is to store a status identifier to indicate whether the apparatus 50 is in a non-provisioned state or a provisioned state. In the present example, the non-provisioned state of the apparatus 50 refers to a state where the apparatus 50 is not connected to a network. For example, the apparatus 50 may be shipped to a customer in a non-provisioned state where the apparatus 50 is to either start a decentralized network or to search for a network to join. The provisioned state of the apparatus 50 refers to a state where the apparatus 50 is part of a decentralized network. In the present example, the apparatus 50 may switch between the non-provisioned state and the provisioned state as the apparatus 50 is installed. Similarly, the apparatus 50 may also be switched from the provisioned state to the non-provisioned state via a reset mechanism, such as when a space is reconfigured or if the apparatus 50 is to be uninstalled and moved to a new location.

The memory storage unit 70 may be also used to store addition data to be used by the apparatus 50. For example, the memory storage unit 70 may store network data, such as a mapping data, or information relating to other devices, such as identifiers, connected to the decentralized network.

In the present example, the memory storage unit 70 may include a non-transitory machine-readable storage medium that may be any electronic, magnetic, optical, or other physical storage device. In other examples, the memory storage unit 70 may be an external unit such as an external hard drive, or a cloud service providing content. The memory storage unit 70 may also be used to store instructions for general operation of the apparatus 50. In particular, the memory storage unit 70 may store an operating system that is executable by a processor to provide general functionality to the apparatus 50, for example, functionality to support various applications. The memory storage unit 70 may additionally store instructions to operate the election engine 75 and the provisioning engine. Furthermore, the memory storage unit 70 may also store control instructions to operate other components and peripheral devices of the apparatus 50, such additional sensors, cameras, user interfaces, and light sources.

The election engine 75 is to facilitate the provisioning process by determining a priority relative to an external device upon receiving a beacon signal via the beacon receiver 60. In the present example, the election engine 75 operates when the apparatus is in a non-provisioned state. It is to be appreciated by a person of skill with the benefit of this description that if the apparatus 50 and the external device are both in the non-provisioned state, it may be unclear which of the apparatus 50 or the external device is to take a lead to initiate a decentralized network and provision the other. Accordingly, the election engine 75 decides whether the apparatus 50 is to take the lead to provision the external device. The manner by which the election engine 75 determines the priority is not particularly limited. For example, the election engine 75 may simply take priority over the external device while the external device attempts to do the same. Accordingly, the first device to take priority will be the provisioning device. If the apparatus 50 and the external device attempt to take priority simultaneously, a delay may be implemented after which the apparatus 50 and the external device will make another attempt. It is to be appreciated by a person of skill with the benefit of this description that the election process to assign priority to a provisioning device from multiple devices may be carried out without intervention from a user.

The manner by which the election engine 75 determines a priority is not particularly limited and those with skill in the art can appreciate that there are mechanisms that can be employed or built upon determine a priority or elect a device in the non-provisioned state to provision a decentralized system. As some examples, random back-off intervals and priority-based selection based on a duration since a device was waiting to be selected may be used.

In other examples, the election engine 75 may communicate with the equivalent component of the external device within communication range to determine the priority. In particular, the determination may be collaboratively carried out based on a plurality of rules. For example, the rules may assign priority to devices that are already in a provisioned state. Accordingly, the election engine 75 may communicate with an external device to determine the state of the external device. If the apparatus 50 is in a non-provisioned state and the external device is in a provisioned state, the election engine 75 may automatically yield priority to the external device. Continuing with the present example, if the external device is in the non-provisioned state, the election engine 75 may randomly determine a priority and communicate the priority to the external device. In other examples, the election engine 75 may compare a unique device identifier of the external device with a unique device identifier of the apparatus and determine the priority based on the arbitrary values of the unique device identifier.

The provisioning engine 80 is to change the status identifier stored in the memory storage unit 70 from the non-provisioned state to the provisioned state and to join a decentralized network with the external device. The manner by which the provisioning engine 80 joins with a decentralized network is not particularly limited. For example, if the election engine 75 determines that the apparatus 50 is to initiate the decentralized network, such as when the apparatus 50 is in the non-provisioned state and the election engine 75 has determined that the apparatus 50 has a higher priority than an external device, the provisioning engine 80 may initiate a decentralized network and subsequently invite the external device to join the decentralized network that was initiated. Alternatively, if the external device is in the provisioned state and the apparatus 50 is in the non-provisioned state, the provisioning engine 80 may join the network to which the external device is a member.

In the present example, the provisioning engine 80 is to confirm that the apparatus 50 and the external device are within the same secure space prior to joining a common decentralized network. It is to be appreciated that although the beacon receiver 60 may receive a beacon signal from an external device in the non-provisioned state, the beacon signal cannot typically be used to identify an external device within a secure space. For example, the device emitting the beacon signal may be a rogue device or a device that is not within the building or not belonging to the same tenant of the building. In the present example, the provisioning engine 80 may use data from the infrared communicator 65 to determine whether the apparatus 50 and the external device are within a predetermined physical proximity or within the same secure space.

Upon establishing the external device is within the same secure space, the provisioning engine 80 initiates the decentralized network if the apparatus 50 is in the non-provisioned state. The manner by which the provisioning engine 80 initiates the decentralized network is not particularly limited. In the present example, the provisioning engine 80 generates a unique provisioning key for the decentralized network. The provisioning key may be a cryptographic key to be used by the apparatus 50 and other devices in the decentralized network to provision additional devices. The provisioning engine 80 may then send the provisioning key to the external device. The manner by which the provisioning engine 80 sends the provisioning key is not limited. In the present example, the provisioning key may be send via a Bluetooth connection. In other examples, the provisioning key may also be sent using other communication components of the apparatus 50, such as the infrared communicator 65. Upon each device being provisioned and added to the decentralized network, a newly provisioned device may use the provisioning key to provision additional devices that are in the non-provisioned state.

If the apparatus is in the provisioned state, the provisioning engine 80 may send an invitation or provisioning key to the external device to join the decentralized network. In some examples, the provisioning engine 80 may store a list of external devices in the non-provisioned state that are within the secure space for subsequent provisioning. For example, the unique device identifier of each of these devices may be stored and invitations to join the decentralized network may be sent at a later time to conserve computational resources.

The manner by which the provisioning engine 80 invites other external devices to the network is not particularly limited. In an example where the memory storage unit 70 includes a list of external devices to be provisioned, the provisioning engine 80 may select a device from the list sequentially or based on information such as the unique device identifier or other data received via the beacon signal. The provisioning engine 80 may then establish a secure communication channel with the external device, such as a Bluetooth Mesh Protocol. The authentication of the device may also be carried out with a challenge response mechanism using factory security keys. It is to be appreciated by a person of skill with the benefit of this description that the external device may then carry out a similar process to provision additional devices within the secure space.

Figure 2:
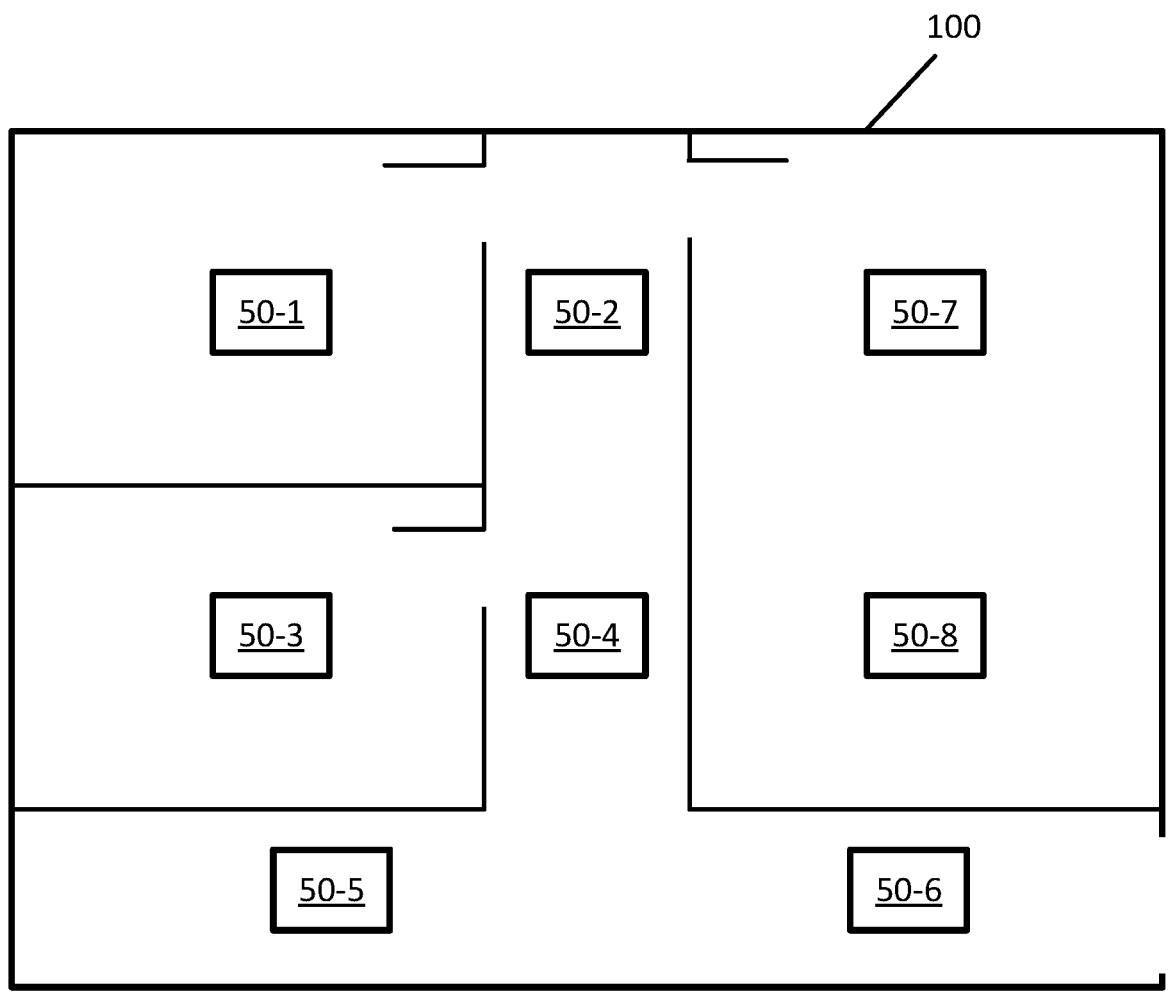
FIG. 2 is a schematic representation of a building space where a system of a plurality of apparatuses shown in FIG. 1 are deployed.

Referring to FIG. 2, a building space 100 with a plurality of rooms and a plurality of apparatuses 50-1, 50-2, 50-3, 50-4, 50-5, 50-6, 50-7, and 50-8 (generically, these apparatuses are referred to herein as "apparatus 50" and collectively they are referred to as "apparatuses 50", this nomenclature is used elsewhere in this description) is shown. In the present example, each of the apparatus 50 is substantially identical and operate together to illuminate the building space 100.

In this example, the apparatuses 50 may be installed in the building space 100 by simply mounting the apparatuses 50 to a support structure such as a ceiling grid. It is to be appreciated that the apparatus 50 are to be powered up by connecting the apparatus to a power source, such as a power grid or battery without further setup.

To illustrate the system in operation, it may be assumed that the apparatuses 50 are new and installed for the first time. In this example, the apparatus 50-1 is powered up first, followed by the apparatus 50-2, followed by the apparatus 50-3, and in order to the apparatus 50-8. Upon powering up the apparatus 50-1, the apparatus 50-1 is in the non-provisioned state and broadcasts a beacon signal. Since there is no other apparatus 50 powered up in this example, no provisioning occurs. As soon as the apparatus 50-2 is powered up, there are two devices in the non-provisioned state emitting a beacon signal. In may be assumed that the election engine of the apparatus 50-1 determines itself to have priority over the apparatus 50-2. Accordingly, the provisioning engine of the apparatus 50-1 initiates a decentralized network and converts the status of the apparatus 50-1 from the non-provisioned state to the provisioned state. The apparatus 50-1 may then determine that he apparatus 50-2 is within a secure space using the infrared communicator which may send and receive signals through the open door shown in FIG. 2. The provisioning engine then invites the apparatus 50-2 to join the decentralized network. Upon powering up the apparatus 50-3, the apparatus 50-2 receives a beacon from the apparatus 50-3 and verifies that is it within the secure space. Since the apparatus 50-2 is in the provisioned state, the apparatus 50-2 is to send an invitation to the apparatus 50-3 to join the decentralized network with the apparatus 50-2 and the apparatus 50-1. In this example, the process continues until all the apparatuses sequentially join the same decentralized network.

Figure 3:
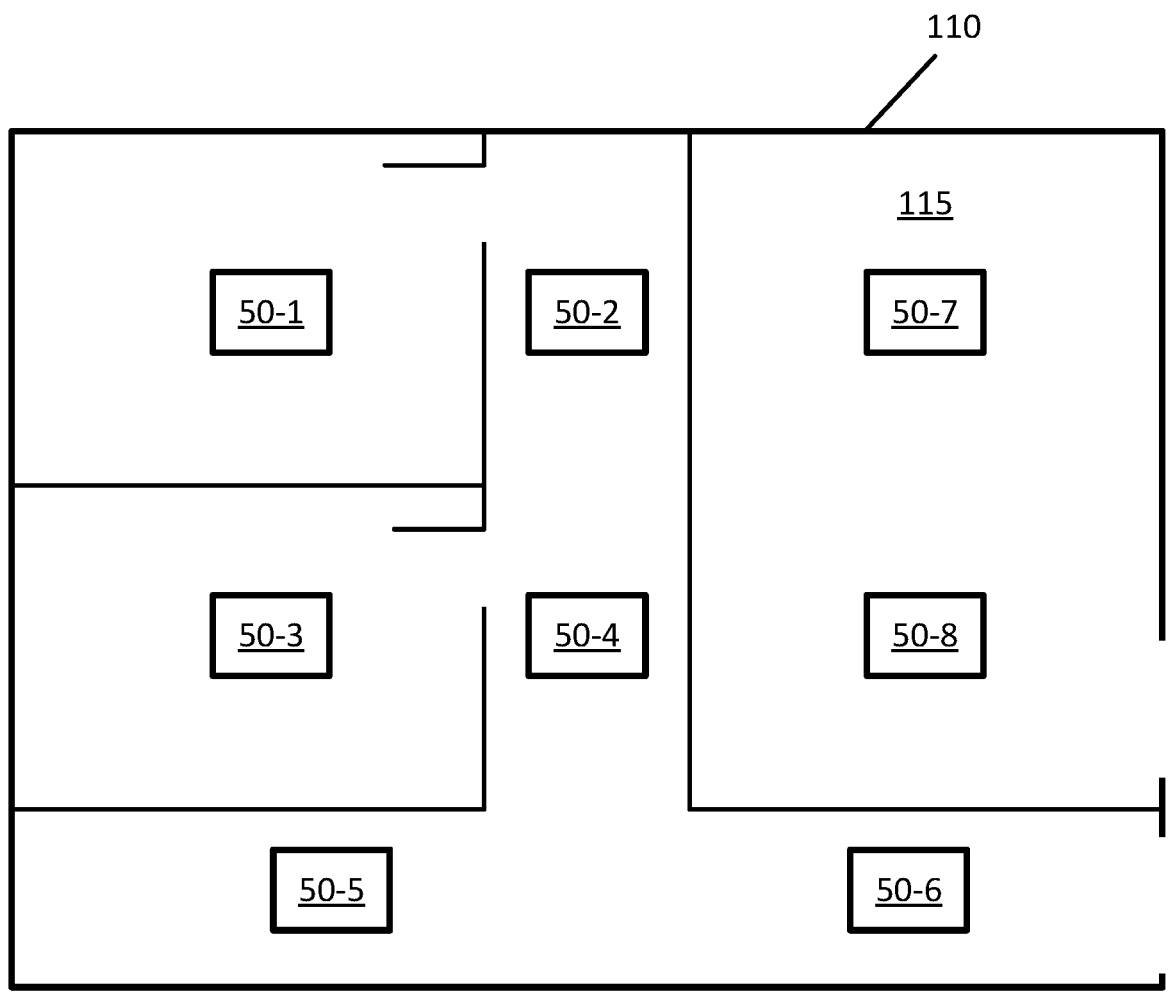
FIG. 3 is a schematic representation of another building space where a system of a plurality of apparatuses shown in FIG. 1 are deployed.

Referring to FIG. 3, another building space 110 with a plurality of rooms and a plurality of apparatuses 50 is shown. In the present example, each of the apparatuses 50 are substantially identical and operate together to illuminate the building space 110.

In this example, the apparatus 50-7 and the apparatus 50-8 are not in the same secure space as the apparatuses 50-1, 50-2, 50-3, 50-4, 50-5, and 50-6. For example, the room 115 may be a separate unit from the other portions of the building space 100, such as a unit belonging to a different tenant. Accordingly, when the apparatuses 50-1, 50-2, 50-3, 50-4, 50-5, and 50-6 are powered up, they will form a decentralized network in a manner similar to that described above. However, if the apparatus 50-7 or the apparatus 50-8 were to be powered up, no communication will be established via the infrared communicators since infrared light will not penetrate the wall separating the room 115. Accordingly, the apparatus 50-7 and the apparatus 50-8 are not able to join the same decentralized network as the other apparatuses 50. Instead, the apparatus 50-7 and the apparatus 50-8 may initiate a separate delocalized network in the manner described above. The separate delocalized network may operate independently of the other apparatuses 50.

Figure 4:
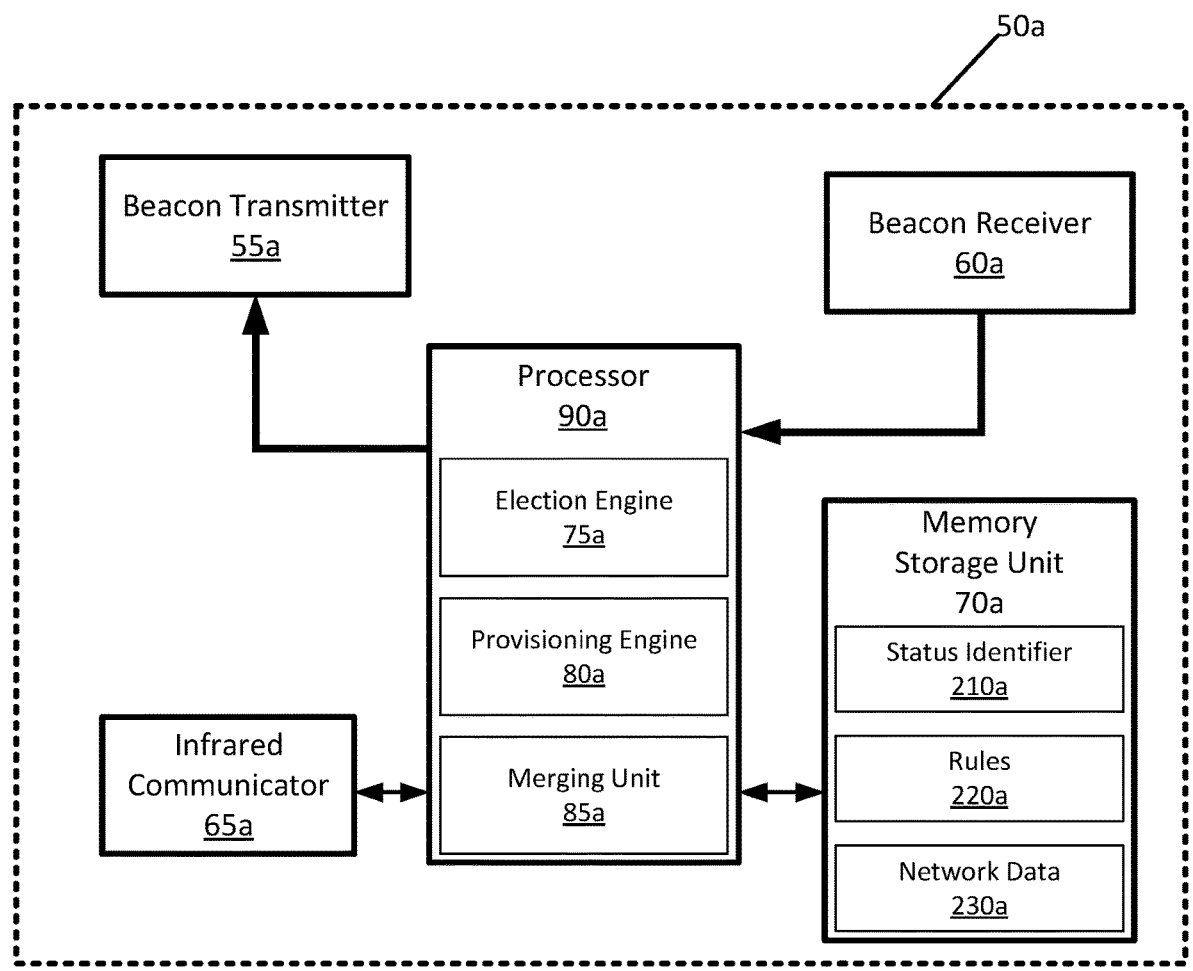
FIG. 4 is a schematic representation of the components of another apparatus to provision a decentralized network.

Referring to FIG. 4, another schematic representation of an apparatus to provision a decentralized network is generally shown at 50*a*. Like components of the apparatus 50*a* bear like reference to their counterparts in the apparatus 50, except followed by the suffix "a". In the present example, the apparatus 50*a* includes a beacon transmitter 55*a*, a beacon receiver 60*a*, an infrared communicator 65*a*, a memory storage unit 70*a*, and a processor 90*a*. In the present example, the processor 90*a* includes components to operate an election engine 75*a*, a provisioning engine 80*a*, and a merging unit 85*a*.

In the present example, the processor 90*a* may include a central processing unit, a microcontroller, a microprocessor, a processing core, a field-programmable gate array, an application-specific integrated circuit, or similar. The processor 90*a* may cooperate with the memory storage unit 70*a* to execute various instructions stored thereon. For example, the memory storage unit 70*a* may store an operating system that is executable by the processor 90*a* to provide general functionality to the apparatus 50*a*, including functionality to autonomously provision a decentralized network in cooperation with other devices. Examples of operating systems include Android Things™, Apache Mynewt™, Zephyr™, and Windows 10 IoT™. Further operating systems may also include Windows™, macOS™, iOS™, Android™, Linux™, and Unix™.

It is to be appreciated by a person of skill with the benefit of this description that autonomous provisioning multiple devices may result in multiple decentralized networks being formed where each decentralized network is associated with a unique network key, especially if devices are installed by multiple people who may start the provisioning process at multiple points within a space. Accordingly, this example provides for multiple devices being provisioned simultaneously to allow for concurrent provisioning. Since the devices may not have the ability to be aware of each other when distances are larger than the range of the beacon signal and/or infrared signals, a plurality of networks having different unique network keys may be formed in a concurrent manner. As the devices within a space are provisioned, the resulting decentralized networks within the secure space may be merged to form one unified decentralized network.

In the present example, the processor 90*a* operates a merging unit 85*a* to merge multiple decentralized networks. For example, the merging unit 85*a* may be triggered when the beacon receiver 60*a* receives a beacon signal from an external device indicating the external device is in a provisioned state while the status of the apparatus 50*a* is also in the provisioned state. The apparatus 50*a* and the external device may be determined to be part of different decentralized networks based on the beacon signals exchanged between the apparatus 50*a* and the external device. The apparatus 50*a* and the external device may be confirmed to be in the same secure space with the infrared communicator 65*a*.

Upon confirmation, the decentralized networks may be merged by the merging unit 85*a* into a single decentralized network. The manner by which the separate decentralized network is merged is not particularly limited. In some examples, the decentralized network with the larger number of devices may absorb the network with fewer devices as determined by data contained within the memory storage unit 70*a* of the apparatus as well as the equivalent component of the external device. The merging process may occur sequentially to propagate the switching of devices from one decentralized network to another decentralized network as each device is switch when within range of the infrared communicator 65*a* of a device from the larger decentralized network. The size of each decentralized network may be stored in each the network data 230*a* on the memory storage unit 70*a*. This information may be communicated between devices either through the beacon transmitter 55*a* or the infrared communicator 65*a*. In other examples, a new decentralized network is initialized or the decentralized network that was initiated first absorbs the other decentralized network. The instructions to merge the decentralized networks is then to be propagated to other devices on the decentralized networks to update the network data at each device.

In the present example, the memory storage unit 70*a* may also maintain databases to store various data used by the apparatus 50*a*. For example, the memory storage unit 70*a* may include a status identifier 210*a* to indicate the status of the apparatus 50*a* as either being in the non-provisioned state or the provisioned state. The memory storage unit 70*a* may also include a database 220*a* to store rules for determining priority by the election engine 75*a*. Furthermore, the memory storage unit 70*a* may also include a database 230*a* to store network data, such as the data regarding other devices that are part of the decentralized network. Accordingly, all devices on the decentralized network may store the network information such that the information is available at all devices. Therefore, any device on the decentralized network may be used to provision net devices to the decentralized network without using a separate designated provisioning device. In addition, the memory storage unit 70*a* may additionally store instructions to carry out operations at the driver level as well as other hardware drivers to communicate with other components and peripheral devices of the apparatus 50*a*, such as various user interfaces to receive input or provide output.

Figure 5:
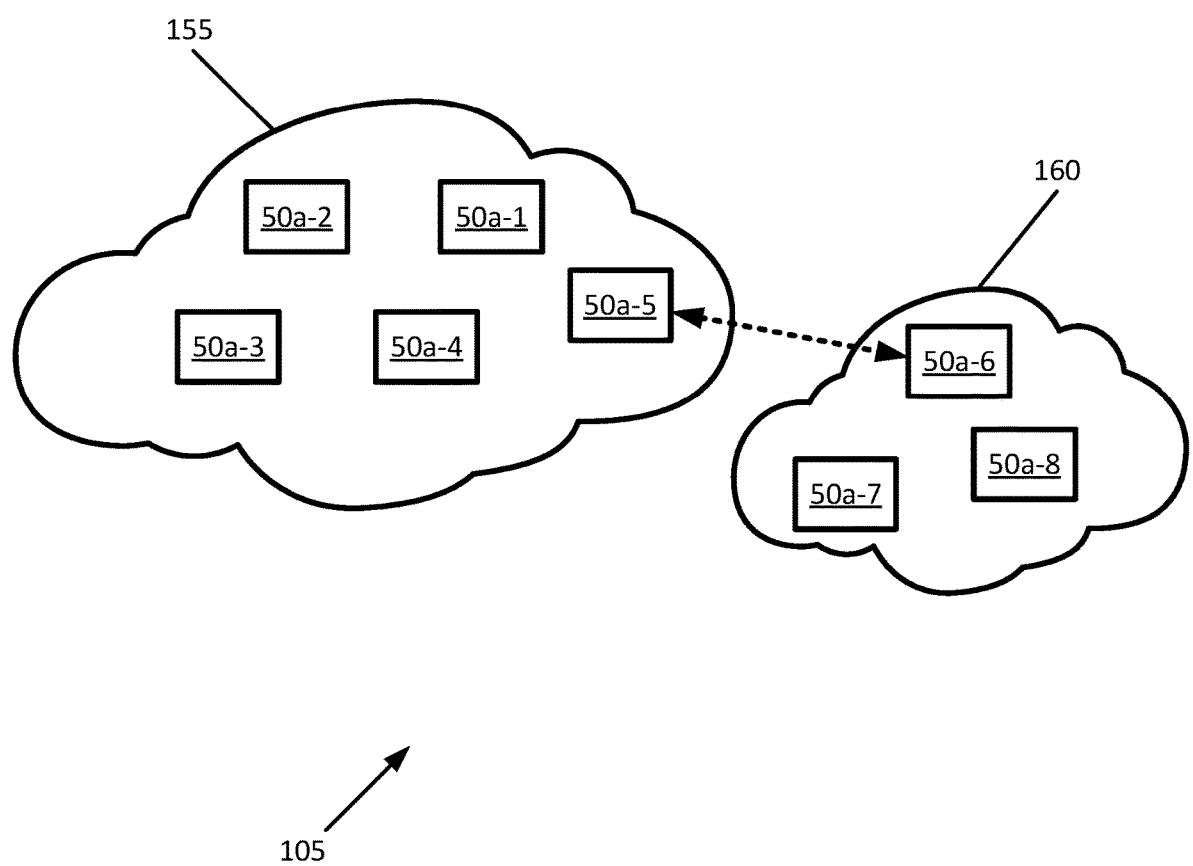
FIG. 5 is a schematic representation showing multiple decentralized networks in proximity to each other.

Referring to FIG. 5, a system 150 with a plurality of rooms and a plurality of apparatuses 50*a*-1, 50*a*-2, 50*a*-3, 50*a*-4, 50*a*-5, 50*a*-6, 50*a*-7, and 50*a*-8 is shown. In the present example, each of the apparatuses 50*a*-1, 50*a*-2, 50*a*-3, 50*a*-4, and 50*a*-5 have formed a first decentralized network 155 and the apparatuses 50*a*-6, 50*a*-7, and 50*a*-8 have formed a second decentralized network 160.

To illustrate the system in operation, it may be assumed that the apparatus 50*a*-5 and the apparatus 50*a*-6 exchange beacon signals to inform each other that they are part of separate decentralized networks. The merging unit 85*a* of the apparatuses 50*a*-5 and 50*a*-6 implement the merging process as discussed above to amalgamate the decentralized network 155 and the decentralized network 160.

Figure 6:
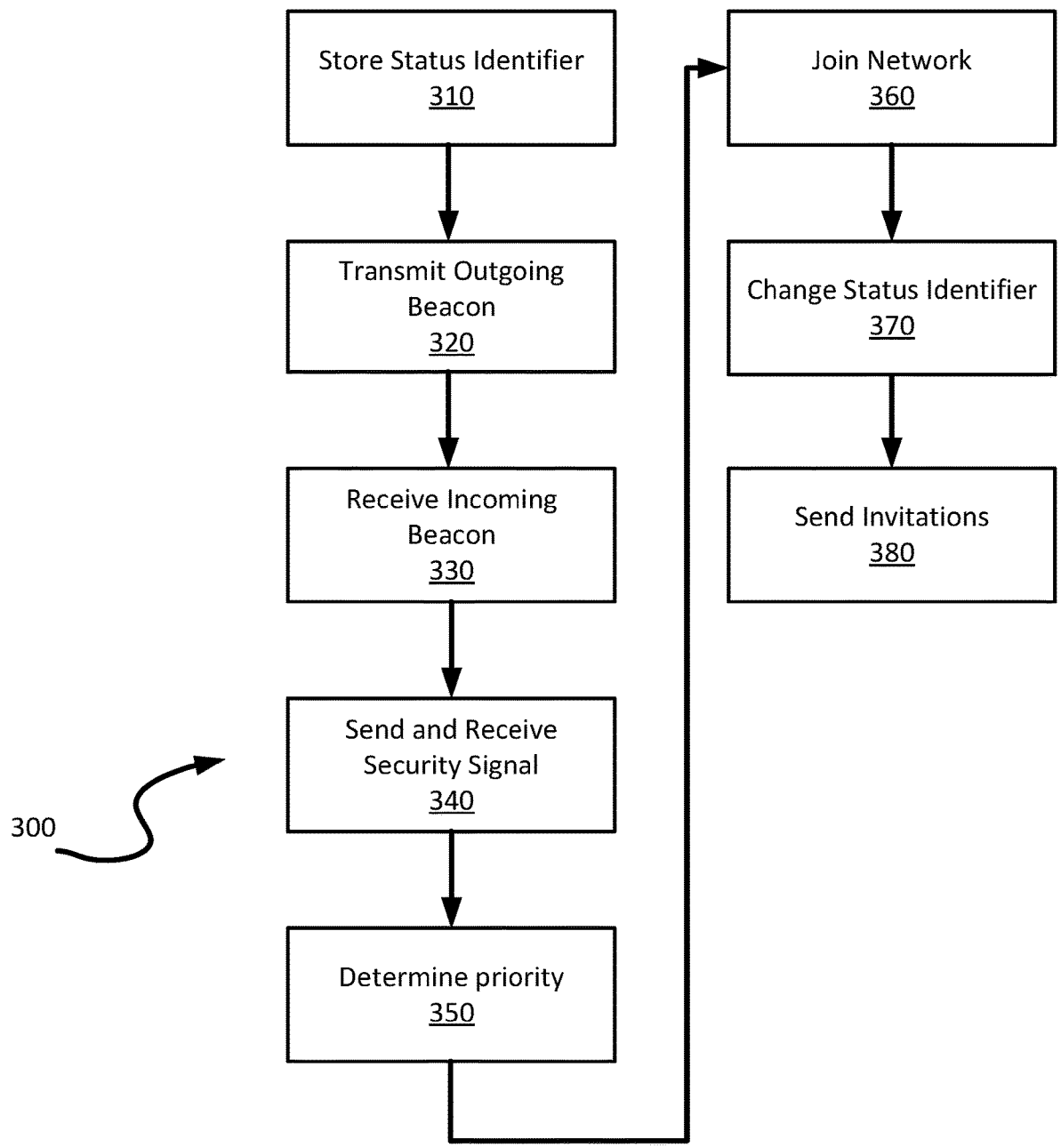
FIG. 6 is a flowchart of an example of a method of provisioning a decentralized network.

Referring to FIG. 6, a flowchart of an example method of provisioning a decentralized network is generally shown at 300. In order to assist in the explanation of method 300, it will be assumed that method 300 may be performed with a plurality of the apparatus 50. Indeed, the method 300 may be one way in which the apparatus 50 and other devices may be configured. Furthermore, the following discussion of method 300 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, the state of the apparatus 50 is to be stored in a status identifier. The apparatus 50 may then periodically transmit an outgoing beacon with information about the apparatus 50, such as the information in the status identifier, at block 320 and listen for and receive a beacons signal from a nearby device at block 330.

Block 340 involves sending a security signal with an infrared communicator to the external device to determine a proximity of the external device as well as whether the external device is within the secure space. After sending the security signal, the apparatus 50 is to receive a response to confirm that the external device is within the secure space. In the event that the location of the external device cannot be confirmed the external device will not be permitted to join the decentralized network.

Next, block 350 involves determining the priority between the apparatus 50*a* and an external device. In the present example, the priority is determined by the election engine 75 when the apparatus is in the non-provisioned state and upon receiving an incoming beacon signal from an external device in the non-provisioned state.

Blocks 360, 370 and 380 are then to be carried out by the provisioning engine 80. Block 360 involves the apparatus 50 joining a network with the external device located within the same secure space. It is to be appreciated that the network to join may also be initiated by the provisioning engine 80 or by another device that is part of a decentralized network. In the present example, the provisioning engine 80 may change the status identifier of the apparatus 50 from the non-provisioned state to the provisioned state if not already done so. Upon changing to the provisioned state, the provisioning engine 80 is to send outgoing invitations to additional devices within the secure space to expand the decentralized network.

It is to be appreciated by a person of skill with the benefit of this description, that that method 300 may be iterated, such as periodically, to conduct ongoing operations to monitor and repair the integrity and operation of the network. In some examples, this may involve the establishment of new network keys based on key derivation functions that are run on a decentralized network that resolve prolonged network fragmentation, elections to establish the size and health of the network, sharing and synchronizing non-volatile data among all devices, such as the next address to be provisioned, using various decentralized network traversal mechanisms. In further examples, the network maintenance activities may be conducted using a combination of traversal and secure encrypted beaconing.

Variations to the methods and apparatus describe above are contemplated. For example, a system may include a plurality of apparatuses, such as light fixture-mount sensors and a plurality of wall-mounted switches without a host device or any intermediary controller. Each light fixture-mounted sensor may include an infrared emitter, a low-resolution two-dimensional image sensor capable of capturing images of infrared emissions, an image processor, a control module capable of coordinating tasks on a decentralized network, a hard-wired communication interface that connects to an LED driver that is co-located in the light fixture, and a radio-frequency communication module. Each wall-mounted switch may include an infrared emitter, a low-resolution image sensor capable of capturing images of infrared emissions, an image processor, a control module capable of coordinating tasks on a decentralized network.

It is also to be appreciated that the apparatus described above may relate to a system for the autonomous self-organization of devices on a decentralized network for an indoor commercial smart lighting application. In some examples, the self-organization of devices may be carried out without the benefit of auxiliary hardware, such as a host controller, or a connection to a supervisory software agent and without human involvement to designate a lead node or to initiate, intervene or terminate the process of self-organization into groups. Furthermore, the devices in the system may not have any prior knowledge of the physical conditions of the building or have any pre-configuration to aid the process of self-organization.

In another example, the apparatus may include a fixture mounted-sensor device. The sensor device may include a mechanism to be physically fastened to the light fixture while remaining accessible for field-servicing without the disassembly of the light fixture. Furthermore, the sensor device may be substantially flush and parallel to the light fixture. In other examples, the sensor device may be side mounted, junction-box mounted, or ceiling-tile mounted. The sensor device may also be energized by a power supply enclosed in the LED driver, using a two-wire connection method commonly used in the commercial smart lighting industry. LED driver power supply may also provide a hard-wired communication interface using the same two-wire pair. For example, the two-wire pair may be compliant with the various communication protocols and standards. A LED driver has electronic drive circuitry to provide variable power to a LED strip used for general illumination. The LED driver may also have an integral power and energy metering capability which may be communicated to the sensor device.

In another example, a system for operating a fixture mounted-sensor device may also be provided. In this example, the system may include a micro-controller block, a DALI block, a low-resolution two-dimensional image sensor, an infrared LED emitter, and an optional daylight sensor. In certain examples, the daylight sensor may be omitted since daylight readings may be obtained using a low-resolution two-dimensional image sensor. It is to be understood that the micro-controller block may include one or more microprocessors, digital signal processors, radio communication transceiver with antenna and supporting hardware, such as memory, programmable I/O, and i2C/SPI communication bus circuitry. The micro-controller and radio communication are used to communicate with other devices via Bluetooth, and Zigbee, Thread or other communication protocols that are suitable for an indoor commercial smart lighting application.

Continuing with this example, the micro-controller may be capable of reading from and writing to DALI block, low-resolution two-dimensional image sensor, and daylight sensor. The micro-controller may also be capable of controlling the power of infrared LED emitter. The micro-controller is equipped with a classifier for detecting walls, windows and doorways by analyzing low-resolution two-dimensional images with or without supplementary data and an organizer that is capable of coordinating tasks with other devices on a decentralized an autonomous network.

The low-resolution two-dimensional image sensor may be capable of capturing images in the infrared spectrum and may also be capable of capturing images in part of or all of the visible spectrum. In some examples, low-resolution two-dimensional image sensor may be optimized for detecting about 850 nm infrared light by using pixels with high quantum efficiency in the about 850 nm spectrum. In some examples, an optical lens is used to provide a wide coverage area. The number of pixels contained within low-resolution two-dimensional image sensor may be sufficiently low such that the raw image captured is not capable of being used to distinguish or identify humans and may only be used to detect the presence of walls, windows and doorways and movement patterns as described in this disclosure.

The infrared LED emitter is capable of projecting infrared light at a commonly used wavelength, such as about 850 nm. It may be configured such that the emission angle is sufficiently wide to cover the field of view of low-resolution two-dimensional image sensor.

It should be recognized that features and aspects of the various examples provided above may be combined into further examples that also fall within the scope of the present disclosure.

What is claimed is:

1. An apparatus comprising:
    a memory storage unit to store a status identifier to indicating whether the apparatus is in a non-provisioned state or a provisioned state;
    a beacon transmitter to transmit an outgoing beacon signal, wherein the beacon signal includes the status identifier;
    a beacon receiver to receive an incoming beacon signal from an external device;
    an infrared communicator to send and receive signals with the external device to confirm the external device is within a secure space;
    an election engine to determine a priority relative to the external device upon receiving the incoming beacon signal, wherein the election engine operates in the non-provisioned state; and
    a provisioning engine to change the status identifier from the non-provisioned state to the provisioned state and to send a provisioning key to the external device to join a network upon confirmation the external device is within the secure space.

2. The apparatus of claim 1, wherein the election engine communicates with the external device to determine the priority.

3. The apparatus of claim 2, wherein the priority is determined based on a plurality of rules.

4. The apparatus of claim 3, wherein the plurality of rules directs the election engine to prioritize the provisioned state above the non-provisioned state.

5. The apparatus of claim 1, wherein the provisioning engine is to initiate the network when the apparatus has a higher priority and the apparatus is in the non-provisioned state.

6. The apparatus of claim 1, further comprising a merging unit to merge a first network with a second network within the secure space, wherein the first network is the network joined by the provisioning engine.

7. The apparatus of claim 6, wherein the merging unit is triggered when the apparatus is in the provisioned state and the incoming beacon signal indicates the external device is in the provisioned state.

8. A method comprising:
    storing a status identifier to indicating whether an apparatus is in a non-provisioned state or a provisioned state;
    transmitting an outgoing beacon signal, wherein the beacon signal includes the status identifier;
    receiving an incoming beacon signal from an external device;
    sending a security signal with an infrared communicator to the external device;
    receiving a response signal from the external device to confirm the external device is within a secure space;
    determining a priority relative to the external device upon receiving the incoming beacon signal when in the non-provisioned state;
    send a provisioning key to the external device to join a network upon confirmation the external device is within the secure space;
    changing the status identifier from the non-provisioned state to the provisioned state; and
    sending outgoing invitations to additional devices within the secure space.

9. The method of claim 8, wherein determining the priority comprises communicating with the external device.

10. The method of claim 9, wherein determining the priority is based on a plurality of rules.

11. The method of claim 10, wherein determining the priority comprises prioritizing the provisioned state above the non-provisioned state based on the plurality of rules.

12. The method of claim 8, further comprising initiating the network when the apparatus has a higher priority than the external device and the apparatus is in the non-provisioned state.

13. The method of claim 8, further comprising merging the network with an additional network within the secure space.

14. The method of claim 13, wherein merging is triggered when the apparatus is in the provisioned state and the incoming beacon signal indicates the external device is in the provisioned state.

15. A non-transitory machine-readable storage medium encoded with instructions executable by a processor, the non-transitory machine-readable storage medium comprising:
    instructions to store a status identifier to indicating whether an apparatus is in a non-provisioned state or a provisioned state;
    instructions to transmit an outgoing beacon signal, wherein the beacon signal includes the status identifier;
    instructions to receive an incoming beacon signal from an external device;
    instructions to send a security signal with an infrared communicator to the external device;
    instructions to receive a response signal from the external device to confirm the external device is within a secure space;
    instructions to determine a priority relative to the external device upon receiving the incoming beacon signal when in the non-provisioned state;
    instructions send a provisioning key to the external device to join a network upon confirmation the external device is within the secure space;
    instructions to change the status identifier from the non-provisioned state to the provisioned state; and
    instructions to send outgoing invitations to additional devices within the secure space.

16. The non-transitory machine-readable storage medium of claim 15, further comprising instructions to communicate with the external device to determine the priority.

17. The non-transitory machine-readable storage medium of claim 16, further comprising instructions to determine the priority based on a plurality of rules.

18. The non-transitory machine-readable storage medium of claim 17, further comprising instructions to prioritize the provisioned state above the non-provisioned state based on the plurality of rules determine the priority.

19. The non-transitory machine-readable storage medium of claim 15, further comprising instructions to initiate the network when the apparatus has a higher priority than the external device and the apparatus is in the non-provisioned state.

20. The non-transitory machine-readable storage medium of claim 15, further comprising instructions to merge the network with an additional network within the secure space when the apparatus is in the provisioned state and the incoming beacon signal indicates the external device is in the provisioned state.

* * * * *